Feb. 13, 1951     E. A. PHANEUF     2,541,830
SYNCHRONOUS MOTOR
Filed March 7, 1950
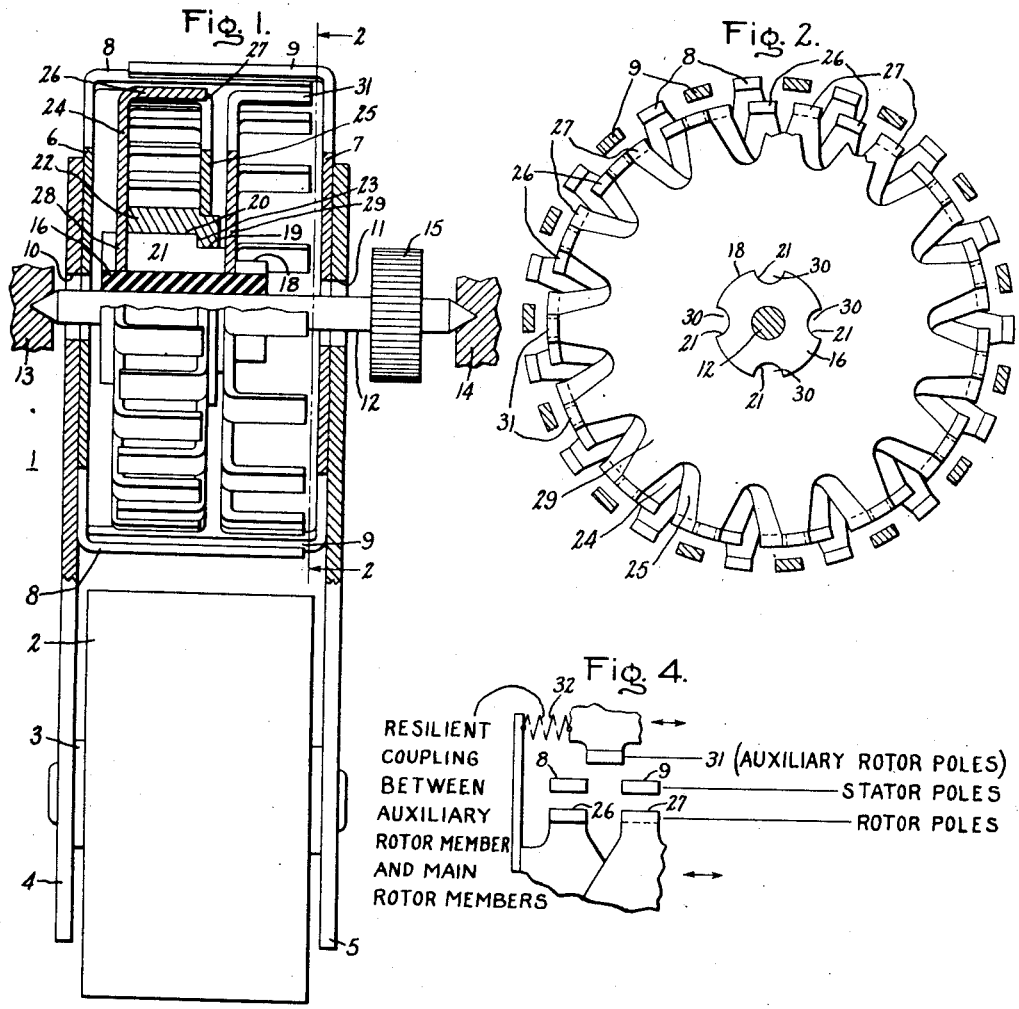
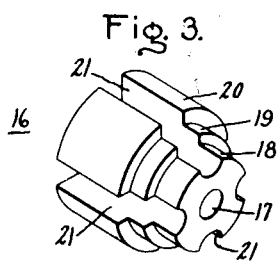
Inventor:
Edgar A. Phaneuf,
by Russell A. Warner
His Attorney.

Patented Feb. 13, 1951

2,541,830

UNITED STATES PATENT OFFICE 2,541,830

SYNCHRONOUS MOTOR

Edgar A. Phaneuf, Southborough, Mass., assignor to General Electric Company, a corporation of New York Application March 7, 1950, Serial No. 148,150

3 Claims. (Cl. 172—275)

1

My invention relates to an improved low speed synchronous motor and more particularly to such a motor having an improved means for effecting automatic starting.

Certain single phase salient pole synchronous motors having low inertia rotors with a large number of poles for a low synchronous speed are self-starting if the motor rotor is positioned with the rotor poles out of magnetic alignment with the stator poles when the motor is initially energized. However, if the rotor is unfavorably positioned, with the rotor poles in magnetic alignment with the stator poles, the motor may not start unless mechanically agitated. Motors of this type commonly stop with their rotors in such unfavorable positions.

It is, therefore, an object of this invention to provide an improved low speed synchronous motor which will start automatically even though the rotor poles are initially in magnetic alignment with the stator poles.

In accordance with this invention, a motor is provided having a starting device in the form of an auxiliary rotor member resiliently coupled to the motor rotor and having salient poles magnetized by leakage flux from the rotor. The poles of the device are positioned at an angle with respect to the rotor poles so that there is a torsion effected in the resilient coupling which provides a vibratory starting torque when the stator is energized.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing in which Fig. 1 is a side view partially in section of the motor of this invention; Fig. 2 is a sectional end view through section 2—2 of Fig. 1 Fig. 3 is a perspective view of the resilient bushing component of the motor and Fig. 4 is a schematic representation of a portion of the motor to simplify the explanation and understanding of the invention.

Referring particularly to Fig. 1, the motor, which is designated as a whole as 1, comprises a stator including a single phase alternating current excitation winding 2 which is in the general shape of an annulus and surrounds a magnetic core 3. Attached to the ends of core 3 and extending perpendicularly therefrom are two side plates 4 and 5. The upwardly extend-

2 ing portions of side plates 4 and 5 support stator members 6 and 7 which are each of a basket-like shape having a disk shaped main body portion and salient pole legs designated as 8 on member 6 and 9 on member 7 which are evenly spaced around the peripheries of the disk portion and bent over at an angle of 90°. The poles 8 and 9 are interleaved and alternately and evenly spaced to form a cylindrical group of pole pieces of alternate polarity extending from the opposite side plates of the stator.

Openings are provided at 10 and 11 in side plates 4 and 5 and at the centers of basket-like members 6 and 7, and a rotor shaft 12 extends through these openings. Shaft 12 is mounted in suitable bearings at 13 and 14 which form a portion of a motor frame structure (not shown). The shaft is also equipped with a pinion gear 15 through which the motor load may be driven.

Mounted upon shaft 12, within the stator enclosure comprising members 6 and 7 is a resilient bushing 16 which may be of rubber or a rubber-like material. Bushing 16 is of a peculiar shape which is best shown in the perspective view of Fig. 3. Referring more particularly to Fig. 3, the bushing, which may also be referred to below as a resilient coupling, contains a central opening 17 for the reception of shaft 12 and a number of stepwise concentric cylindrical portions 18, 19 and 20 of progressively increasing diameters. Four equally spaced radially inwardly extending slots are cut in the exterior of the sleeve to a radius which is less than the radius of surface 18. Referring again to Fig. 1, a toroidally shaped permanent magnet 22 is mounted on the surface 20 of bushing 16 with an axial positioning lip at 23 extending over the surface 19 of bushing 16. Magnet 22 is preferably of a material having a high magnetic retentivity such as an alloy of aluminum, nickel and cobalt and is magnetized in an axial direction. The rotor itself comprises two basket-like members 24 and 25 which correspond closely in structure to stator members 6 and 7 and are mounted in a similar relationship on bushing 16 at the axial ends of permanent magnet 22. Each of the rotor members 24 and 25 has salient pole legs respectively designated 26 and 27 having angular spacing corresponding to the angular spacing of legs 8 and 9. Member 24 includes radial positioning ears 28 which extend radially inwardly into slot 21 in bushing 16 to limit rotation of the rotor with respect to the bushing.

An auxiliary rotor member 29 is provided which is mounted upon surface 18 of bushing 16 in slight axially spaced relationship with respect to permanent magnet 22. Member 29 is also of a basket-like structure which is similar to member 24 except that positioning tongues 30 are provided which are slightly angularly displaced with respect to the tongues 28 of member 24 so that the poles 31 of auxiliary rotor member 29 are slightly displaced from the poles 26 and 27 when the corresponding tongues 28 and 30 are positioned in the slots 21.

The angular relationships of these various rotor and stator poles are shown in Fig. 2 which is a partial sectional view of the motor of this invention through section 2—2 of Fig. 1. The bushing 16 acts as a resilient coupling between the rotor members 24 and 25 and the auxiliary rotor member 29 so that limited rotation of the auxiliary member 29 with respect to the main rotor members is possible, but only under the resilient restraint imposed by the bushing 16.

Alternating current stator winding 2 magnetically energizes stator members 6 and 7 through core 3 and side plates 4 and 5 so that member 6 has one instantaneous polarity while member 7 has the opposite instantaneous polarity and the associated stator poles 8 and 9 are, therefore, instantaneously oppositely poled. Similarly, the rotor magnet 22 magnetizes rotor members 24 and 25 to give the rotor poles 26 and 27 opposite magnetic polarities. The auxiliary rotor member 29 is magnetized by permanent magnet 22 with the same magnetic polarity as member 25 but with a relatively weak intensity due to the axial displacement between magnet 22 and member 29. Auxiliary rotor poles 31 are therefore relatively weaker than the regular rotor poles 26 and 27 but are also positioned for magnetic cooperation with stator poles 8 and 9.

In Fig. 4 there is shown a schematic representation of a portion of the rotor and stator including a pair of rotor poles 26 and 27, an auxiliary rotor pole 31 and a pair of stator poles 8 and 9 The resilient coupling between the main and auxiliary rotor members formed by resilient sleeve 16 is represented schematically as a coil spring 32. The purpose of this schematic view is to simplify the explanation and understanding of the principle of operation of the motor of this invention. In this schematic representation, movement to the left or right by the rotor elements correspond to rotor rotation.

Starting operation of the motor is as follows: When the motor is de-energized, that is, when the stator winding 2 is de-energized, the rotor poles 26 and 27 tend to align themselves directly opposite stator poles 8 and 9, either because this is the lowest magnetic reluctance position, or because a slight residual magnetism remains in poles 8 and 9 to cause these poles to attract poles 26 and 27 or both of these factors may be involved. Neglecting the effect of the auxiliary rotor, if the stator is energized to start the motor while the rotor poles are in this perfectly aligned position, the alternate attraction and repulsion forces between the stator and rotor poles are entirely in radial directions and no rotor torque results, so that the motor remains at a standstill. However, with auxiliary rotor pole 31 positioned as shown with an angular displacement to the main rotor poles 26 and 27 and having a magnetization of the same polarity as rotor pole 27, the alternating stator field causes an alternate attraction and repulsion of pole 31 to stator poles 8 and 9. The resilient coupling between auxiliary rotor member 29 and the main rotor members 24 and 25 provided by bushing 16 allows for a certain amount of rotational oscillatory movement of the auxiliary rotor member and a resulting transmission of forces through the resilient coupling to the main rotor members 24 and 25 to cause a displacement of the main rotor poles 26 and 27. The perfect alignment of rotor and stator poles is thereby altered, a motor torque is created and the motor is started.

The rubber bushing 16, in addition to serving as a resilient coupling between the main rotor and the auxiliary rotor member 29 also serves to make the operation of this motor quieter than it otherwise would be, since small vibrations of the rotor members 24, 25 and 29 are not transmitted directly to the shaft 12, bearings 13 and 14 and thus to the frame of the motor. Other resilient connection means could be used between the main and auxiliary rotors. However, the one shown is considered to be most desirable.

It will be seen from the above description that this invention provides an improved motor structure for automatic motor starting which is particularly characterized by economy and simplicity of structure and quietness and reliability in operation.

While the present invention has been described by reference to a particular embodiment thereof, it will be understood that numerous modifications may be made by those skilled in the art without actually departing from the invention. It is, therefore, the aim in the appended claims to cover all such equivalent variations as come within the true spirit and scope of the invention.

What I claim as new and desire to secure by Letters Patent of the United States is:

1. A self-starting synchronous motor including five basket-like members, each comprising a magnetic disk and a plurality of salient magnetic pole legs extending in one axial direction from the periphery of said disk, said legs being equal in number on each member and evenly spaced around the circumference of said disk, a stator and a rotor each comprising a pair of said basket-like members concentrically positioned in axially spaced relationship, with the legs of each member of each pair extending axially in the direction of the disk portion of the other member of the pair, the legs of the members of each pair being alternately angularly spaced at the same radius, magnetic side plates respectively connected to said basket-like stator members, a magnetic core member interconnecting said side plates, an alternating current winding for magnetic excitation of one pair of said members with alternating fields of respectively opposite polarities, a permanent magnet for excitation of the other pair with respectively opposite polarities, an auxiliary element comprising one of said basket-like members resiliently coupled to one of said pairs by means of a resilient bushing supporting said pair for limited resiliently restrained rotational movement with respect thereto and being equal in radius to the members of said last-mentioned pair, said element being positioned in slight angular displacement adjacent to said last mentioned pair for magnetization therefrom and arranged for magnetic cooperation with the other of said pairs.

2. A self-starting synchronous motor including a plurality of basket-like members, each comprising a magnetic disk and a plurality of salient pole legs extending in one axial direction from the periphery of said disk, said legs being equal in number on each member and evenly spaced around the circumference of said disk, a stator and a rotor each comprising a pair of said basket-like members concentrically positioned in axially spaced relationship, with the legs of each member of each pair extending axially in the direction of the disk portion of the other member of the pair, the legs of the members of each pair being alternately angularly spaced at the same radius, magnetic side plates respectively connected to said stator members, a magnetic core interconnecting said side plates, an alternating current winding surrounding said core for magnetic excitation of said stator, a rotor shaft concentrically positioned with respect to said stator members, a resilient bushing on said shaft, said rotor being mounted on said bushing for rotation within said stator, an axially magnetized toroidal magnet at the hub of said rotor for magnetizing the salient pole legs of the respective rotor members with opposite magnetic polarity, an auxiliary rotor element comprising one of said basket-like members having a radius equal to the rotor radius and concentrically positioned on said resilient bushing within said stator in proximity to said magnet for magnetization therefrom with the salient pole legs thereof extending axially away from said rotor.

3. A self-starting synchronous motor including five basket-like members, each comprising a magnetic disk and a plurality of salient pole legs extending in one axial direction from the periphery of said disk, said legs being equal in number on each member and evenly spaced around the circumference of said disk, a stator and a rotor each comprising a pair of said basket-like members concentrically positioned in axially spaced relationship, with the legs of each member of each pair extending axially in the direction of the disk portion of the other member of the pair, the legs of the members of each pair being alternately angularly spaced at the same radius, said stator members having a larger radius and surrounding said rotor members, a magnetic core interconnecting said stator members, an alternating current winding associated with said core for magnetic excitation of said stator, a rotor shaft concentrically positioned with respect to said stator members, a combined resilient bushing and coupling on said shaft, said rotor being mounted on said bushing for rotation within said stator, an axially magnetized toroidal magnet at the hub of said rotor for magnetizing the salient pole legs of the respective rotor members with opposite magnetic polarity, an auxiliary rotor element comprising one of said basket-like members corresponding in size and shape to said rotor members and concentrically positioned on said resilient bushing and resiliently coupled to said rotor thereby, said auxiliary member being positioned within said stator in proximity to said magnet for magnetization therefrom with the salient pole legs thereof extending axially away from said rotor and in slight circumferential displacement from the legs of said rotor.

EDGAR A. PHANEUF.

REFERENCES CITED

The following references are of record in the file of this patent:

UNITED STATES PATENTS

| Number | Name | Date |
| --- | --- | --- |
| 2,250,395 | Russell | July 22, 1941 |
| 2,432,573 | Jorgensen | Dec. 16, 1947 |

FOREIGN PATENTS

| Number | Country | Date |
| --- | --- | --- |
| 394,784 | Great Britain | July 6, 1933 |